(12) United States Patent
Nishikawa

(10) Patent No.: US 9,385,908 B2
(45) Date of Patent: Jul. 5, 2016

(54) COMMUNICATION APPARATUS AND COMMUNICATION METHOD

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 14/151,964

(22) Filed: Jan. 10, 2014

(65) Prior Publication Data

US 2014/0198881 A1 Jul. 17, 2014

(30) Foreign Application Priority Data

Jan. 15, 2013 (JP) ................. 2013-004387

(51) Int. Cl.
*H04L 27/28* (2006.01)
*H04L 27/26* (2006.01)

(52) U.S. Cl.
CPC .......... *H04L 27/2636* (2013.01); *H04L 27/262* (2013.01)

(58) Field of Classification Search
USPC ................................. 375/260, 295
See application file for complete search history.

(56) References Cited

U.S. PATENT DOCUMENTS

| | | | | |
|---|---|---|---|---|
| 6,701,163 B1* | 3/2004 | Hiramatsu | ........... | H03G 3/3042 370/206 |
| 7,340,006 B2* | 3/2008 | Yun | ............ | H04L 27/2618 375/260 |
| 7,496,028 B2* | 2/2009 | Jung | ............ | H04L 27/2618 370/208 |
| 7,715,492 B2* | 5/2010 | Seki | ............ | H04L 27/2636 375/260 |
| 8,331,420 B2* | 12/2012 | Kleider | ............ | H04L 5/0023 370/500 |
| 8,625,715 B2* | 1/2014 | Rajagopal | ............ | H04L 25/0226 375/260 |
| 2004/0213194 A1* | 10/2004 | Tsuie | ............ | H04L 27/2647 370/342 |

(Continued)

FOREIGN PATENT DOCUMENTS

JP 2006-165781 6/2006
JP EP 2398200 A1 * 12/2011 .......... H04L 25/0226

OTHER PUBLICATIONS

Takyu et al. Scattered Pilot Assisted Channel Estimation for IFDMA, Wireless Communication, Vehicular Technology, Information Theory and Aerospace & Electronic Systems Technology, 2009. Vehicular Technology, Information Theory and Aerospace & Electronic Systems Technology, 2009.*
Ryu et al., "Dummy sequence insertion (DSI) for PAPR reduction in the OFDM communication system," IEEE Transactions on , vol. 50, No. 1, pp. 89,94, Feb. 2004.*
Daiji Motokawa, Eiji Okamoto, and Yasunori Iwanami, "A channel estimation scheme with a peak-to-average power ratio reduction in single carrier-frequency domain equalization using sparse pilot symbols" Technology Study Reports of the Institute of Electronics, Information and Communication Engineers, RCS Wireless Communication System. The Institute of Electronics, Information and Communication Engineers, Aug. 2009, vol. 109, p. 165-170.

*Primary Examiner* — Daniel Washburn
*Assistant Examiner* — Berhanu Tadese
(74) *Attorney, Agent, or Firm* — Warner Norcross & Judd LLP

(57) ABSTRACT

A communication apparatus comprises an inserter that inserts an element having a value of 0 or nearly 0 into a predetermined position of a modulated signal to generate inserted data; an operator that adds a pilot signal comprising a data series of which the elements at the positions corresponding to the predetermined positions in the modulated signal are multiplied by a first amplitude coefficient and the elements other than the elements multiplied by the first amplitude coefficient are multiplied by a second amplitude coefficient to the inserted data to generate a post-operation data; an IFFT unit that performs IFFT on the post-operation data; and a transmitter that generates a baseband signal based on the post-operation data on which the IFFT is performed and transmits a transmission signal generated from the baseband signal.

5 Claims, 11 Drawing Sheets

(56) References Cited

U.S. PATENT DOCUMENTS

2008/0285595 A1* 11/2008 Chester .................. H04B 1/707 370/482

2008/0299984 A1* 12/2008 Shimomura ........ H04W 52/325 455/446

* cited by examiner

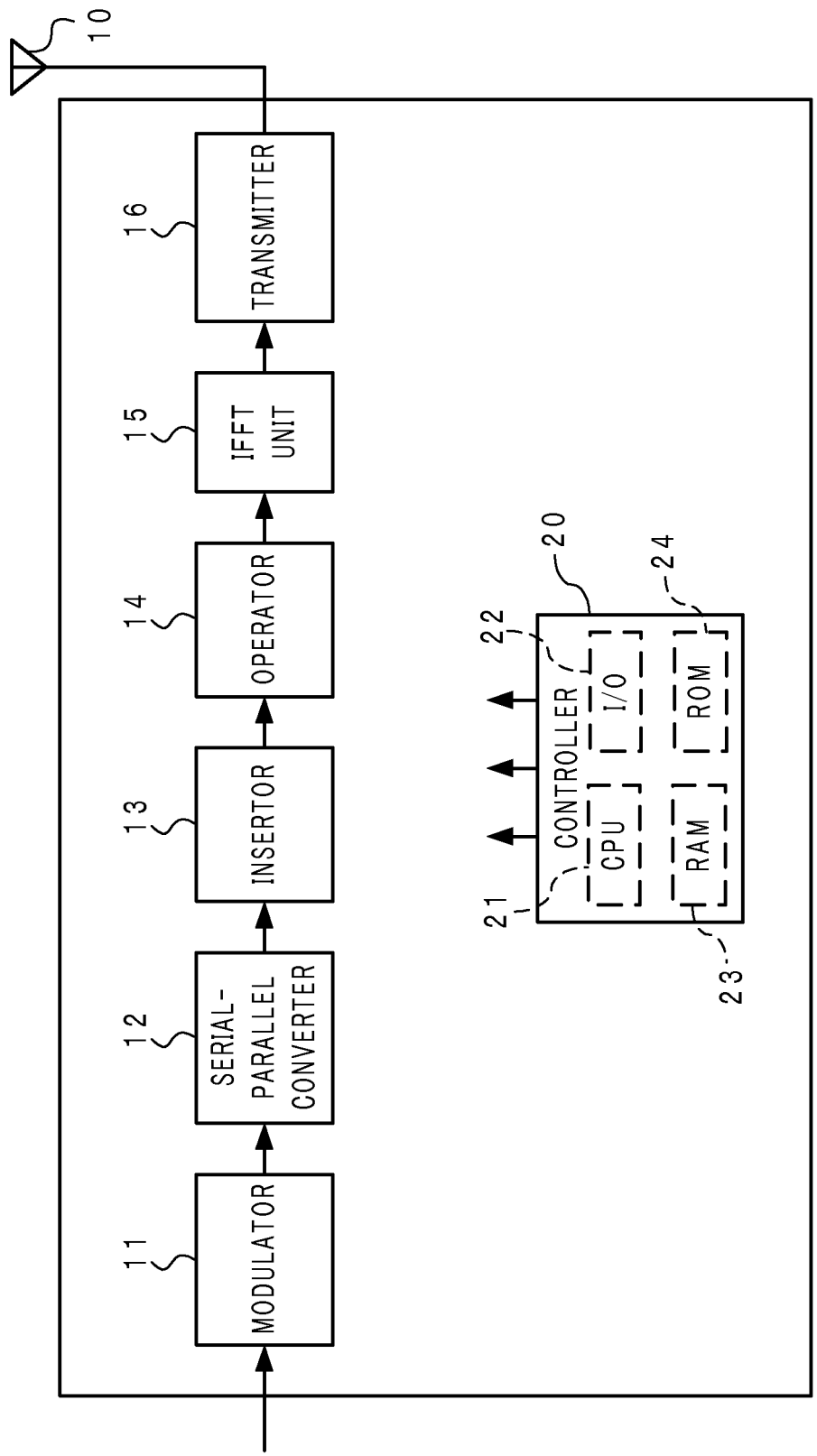

COMMUNICATION APPARATUS AND COMMUNICATION METHOD

CROSS-REFERENCE TO RELATED APPLICATION

This application claims the benefit of Japanese Patent Application No. 2013-004387, filed on Jan. 15, 2013, the entire disclosure of which is incorporated by reference herein.

FIELD

This application relates to a communication apparatus and a communication method.

BACKGROUND

In OFDM (Orthogonal Frequency-Division Multiplexing) communication, PAPR (Peak-to-Average Power Ratio) becomes higher as FFT (Fast Fourier Transformation) size is increased.

A literature 1 (Unexamined Japanese Patent Application Kokai Publication No. 2006-165781) discloses an OFDM communication apparatus controlling the phase of subcarrier modulated signal based on the optimum phase calculated by a sequential decision procedure, prior to IFFT (Inverse Fast Fourier Transformation) in order to reduce the PAPR. On the other hand, a literature 2 (Daiji Motokawa, Eiji Okamoto, Yasunori Iwanami, "A channel estimation scheme with a peak-to-average power ratio reduction in single carrier-frequency domain equalization using sparse pilot symbols" Technology Study Reports of The Institute of Electronics, Information and Communication Engineers, RCS Wireless Communication System, The Institute of Electronics, Information and Communication Engineers, August of 2009, Vol. 109, p 165-170) discloses a technique of reducing the PAPR by applying a pilot signal is a CAZAC (Constant Amplitude Zero Auto-Correction) series to SC (Single Carrier) transmission.

SUMMARY

However, the apparatus disclosed in the literature 1 needs to repeat the calculation to calculate the optimum phase for reducing the PAPR and control the phase for each subcarrier. Additionally, when performing multicarrier transmission by the technique disclosed in the literature 2, the FFT size becomes larger as the number of subcarriers is increased, and a problem is that the PAPR is not efficiently reduced.

Accordingly, it is an object of the present invention to reduce the PAPR more efficiently with a relatively simple configuration even in the case of performing multicarrier transmission.

To achieve the objective, there is provided a communication apparatus according to a first aspect of the invention, comprising:

an inserter that inserts an element having a value of 0 or nearly 0 into a predetermined position of a modulated signal is a signal to which an input signal is modulated to generate inserted data of which the number of elements is equal to a size of Fast Fourier Transformation (FFT);

an operator that adds a pilot signal comprising a data series of which the number of elements is equal to the size and of which the elements at the positions corresponding to the predetermined positions are multiplied by a first amplitude coefficient and the elements other than the elements multiplied by the first amplitude coefficient are multiplied by a second amplitude coefficient to the inserted data to generate an post-operation data;

an IFFT unit that performs an Inverse Fast Fourier Transformation (IFFT) on the post-operation data; and a transmitter that generates a baseband signal based on the post-operation data on which the IFFT is performed and transmits a transmission signal generated from the baseband signal.

A communication apparatus according to a second aspect of the invention, comprising:

a receiver that receives a transmission signal from an external source and generates a baseband signal from the transmission signal;

an FFT unit that performs a Fast Fourier Transformation (FFT) on the baseband signal to generate converted data;

an extractor that subtracts a pilot signal comprising a data series of which the number of elements is equal to the FFT size and of which the elements at the positions corresponding to predetermined positions in the converted data are multiplied by a first amplitude coefficient and the elements other than the elements multiplied by the first amplitude coefficient are multiplied by a second amplitude coefficient from the converted data, and also extracts the elements of the post-subtraction converted data except the elements at the predetermined positions to generate extracted data; and a demodulator that demodulate the extracted data.

It is preferable that the communication apparatus further comprises:

a divider that generates a received data comprising the converted data in which the values of the elements at the predetermined positions are replaced with elements having a value of 0 or nearly 0 and generates an interpolation data comprising the converted data in which the values of the elements at the positions other than the predetermined positions are replaced with elements having a value of 0 or nearly 0;

an interpolator that divides the interpolation data by the pilot signal to generate interpolated data comprising the divided interpolation data of which the elements having a value of 0 or nearly 0 are interpolated with the values of the other elements; and an equalizer that equalizes the received data based on the interpolated data to generate an equalized data, wherein the extractor subtracts the pilot signal from the equalized data instead of subtracting the pilot signal from the converted data and extracts the elements of the post-subtraction equalized data except the elements at the predetermined positions to generate an extracted data.

It is preferable that the first amplitude coefficient is greater than the second amplitude coefficient and the difference between the first and second amplitude coefficients is equal to or less than a threshold.

It is preferable that the data series is a data series having an autocorrelation property.

A communication method according to a third aspect of the invention comprising:

an insertion step of inserting an element having a value of 0 or nearly 0 into a predetermined position of a modulated signal is a signal to which an input signal is modulated to generate inserted data of which the number of elements is equal to a size of Fast Fourier Transformation (FFT);

an operation step of adding a pilot signal comprising a data series of which the number of elements is equal to the size and of which the elements at the positions corresponding to the predetermined positions are multiplied by a first amplitude coefficient and the elements other than the elements multiplied by the first amplitude coefficient are multiplied by a second amplitude coefficient to the inserted data to generate post-operation data;

an IFFT step of performing Inverse Fast Fourier Transformation (IFFT) on the post-operation data; and a transmission step of generating a baseband signal based on the post-operation data on which the IFFT is performed and transmitting a transmission signal generated from the baseband signal.

A communication method according to a fourth aspect of the invention comprising:

a reception step of receiving a transmission signal from an external source and generating a baseband signal from the transmission signal;

an FFT step of performing a Fast Fourier Transformation (FFT) on the baseband signal to generate converted data;

an extraction step of subtracting a pilot signal comprising a data series of which the number of elements is equal to the FFT size and of which the elements at the positions corresponding to predetermined positions in the converted data are multiplied by a first amplitude coefficient and the elements other than the elements multiplied by the first amplitude coefficient are multiplied by a second amplitude coefficient from the converted data, and extracting the elements of the post-subtraction converted data except the elements at the predetermined positions to generate extracted data; and a demodulation step of demodulating the extracted data.

According to the invention, it is possible to reduce the PAPR more efficiently with a relatively simple configuration even in the case of performing multicarrier transmission.

BRIEF DESCRIPTION OF THE DRAWINGS

A more complete understanding of this application can be obtained when the following detailed description is considered in conjunction with the following drawings, in which:

FIG. 1 is a block diagram illustrating a configuration example of a communication apparatus according to an embodiment of the invention;

DETAILED DESCRIPTION

Figure 2A:
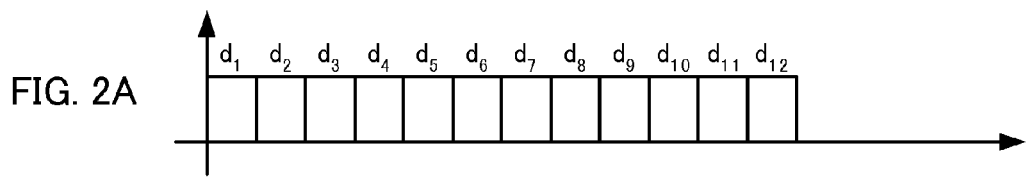
FIGS. 2A to 2E are diagrams illustrating an example of the operation processing performed by the communication apparatus at the transmission side according to the embodiment.

An exemplary embodiment of the invention will be described in detail herein with reference to the accompanying drawings. Like or same reference numerals are given to those components which are the same as, or correspond to, the components shown in the diagrams. An IFFT (Inverse Fast Fourier Transformation) is a concept including an IDFT (Inverse Discrete Fourier Transformation) hereinafter. Likewise, An FFT (Fast Fourier Transformation) is a concept including a DFT (Discrete Fourier Transformation) hereinafter. Therefore, the embodiment may be configured to perform the IDFT instead of the IFFT, and to perform the DFT instead of the FFT. When the IDFT and the DFT are carried out, the FFT size means the size of the DFT hereinafter.

First, a communication apparatus 1 according to an embodiment of the invention will be described with reference to FIG. 1. The communication apparatus 1 communicates with other apparatus through wireless communication of an OFDM (orthogonal frequency-division multiplexing) scheme. The communication apparatus 1 comprises an antenna 10, a modulator 11, a serial-parallel converter 12, an inserter 13, an operator 14, an IFFT unit 15, a transmitter 16, and a controller 20.

The controller 20 comprises a CPU (central processing unit) 21, an I/O (input/output) 22, a RAM (random access memory) 23, and a ROM (read only memory) 24. In the figure, signal lines connecting the controller 20 to the components 11 to 16 are omitted to avoid complication.

The RAM 23 stores, for example, data for the CPU 21 to generate transmission frame. The ROM 24 stores a control program for the CPU 21 to control the operation of the entire communication apparatus 1. The CPU 21 controls the components 11 to 16 connected via the I/O 22 based on the control program stored on the ROM 24 so as to control the entire communication apparatus 1.

The modulator 11 modulates an input signal to generate a modulated signal. The modulator 11 sends the modulated signal to the serial-parallel converter 12. The modulation scheme is, for example, QPSK (quadrature phase-shift keying). The serial-parallel converter 12 performs serial-parallel conversion on the modulated signal and sends the serial-parallel-converted signal to the inserter 13. The serial-parallel-converted signal d is expressed by the equation (1) in which M is the number of elements of the modulated signal d.

[Eq 1]

$$d = \begin{bmatrix} d_1 \\ \vdots \\ d_M \end{bmatrix} \quad (1)$$

The inserter 13 inserts a element having a value of 0 in the serial-parallel-converted signal at a predetermined position. Then, the inserter 13 generates an inserted data of which the number of elements is equal to the FFT size. Here, the value of the elements to be inserted is not limited to zero and can be a real number close to zero (a real number that can be assumed to be zero). The positions at which the elements are inserted can be determined on an arbitrary basis. The transmission side and reception side (each communication apparatus 1) obtain in advance and share information on the positions at which the elements are inserted. For example, the inserter 13 inserts elements having a value of 0 in the serial-parallel-converted signal d at equal intervals as expressed by the equation (2) to generate inserted data f in which T indicates that the matrix is transposed.

[Eq 2]

$$f=[0\ d_1\ d_2\ d_3\ 0\ \ldots\ d_M]^T \quad (2)$$

Figure 2B:
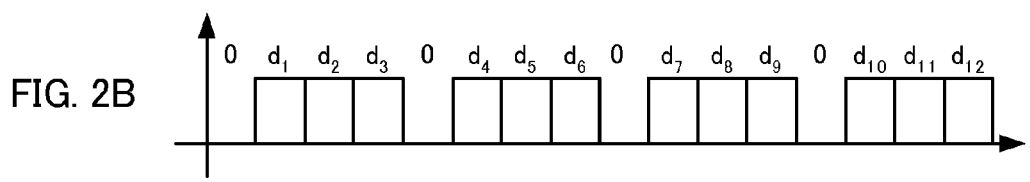

More specifically, provided that the FFT size is 16 and the element insert positions are before the first element and after every three consecutive elements, the inserter 13 inserts elements having a value of 0 in the serial-parallel-converted signal d shown in FIG. 2A before the first element and after every three consecutive elements. Then, as shown in FIG. 2B, inserted data f of which the number of elements is equal to the FFT size and in which the elements having a value of 0 are inserted at equal intervals are generated. The inserter 13 sends the generated data f to the operator 14. In FIGS. 2A and 2B, the elements are plotted as abscissa and the values of the elements are plotted as ordinate. This also applies to FIGS. 2C to 2E described later. Only the real parts of the elements are shown for easier understanding.

The operator 14 generates and retains a pilot signal g before receiving the inserted data f from the inserter 13. The pilot signal g is generated by multiplying the elements constituting any data series by a first amplitude coefficient or a second amplitude coefficient. Any data series can be, for example, random signals or a data series having an autocorrelation property, and has an equal number of elements to the FFT size. A data series having an autocorrelation property is a data series of which the autocorrelation value to the same data series in which no data shift is conducted is higher than the autocorrelation value to a data series in which any data shift is conducted. A data series having an autocorrelation property can be, for example, a CAZAC (constant amplitude zero auto-correlation) series or a PN (pseudorandom noise) series. A data series having an autocorrelation property has a relatively low PAPR and is less influenced by fading. An exemplary CAZAC data series c is expressed by the equation (3) in which N is the number of elements of the data series c, which is equal to the FFT size.

[Eq 3]

$$c = \begin{bmatrix} c_1 \\ \vdots \\ c_N \end{bmatrix} \quad (3)$$

The operator 14 multiplies the elements of the data series c that correspond to the elements having a value of 0 (the elements inserted in the modulated signal) of the inserted data f by a first amplitude coefficient α and multiplies the other elements of the data series c by a second amplitude coefficient β. Then, the operator 14 generates a pilot signal g expressed by the equation (4). The first and second amplitude coefficients α and β are coefficients for adjusting the PAPR (Peak-to-Average Power Ratio) and BER (Bit Error Rate) of the baseband signal. The first and second amplitude coefficients α and β are set so that the first amplitude coefficient α is greater than the second amplitude coefficient β and the difference between the first and second amplitude coefficients α and β is equal to or less than a given threshold. With this setting, the PAPR of the baseband signal can efficiently be reduced as described later.

[Eq 4]

$$g=[\alpha\cdot c_1\ \beta\cdot c_2\ \beta\cdot c_3\ \alpha\cdot c_4\ \alpha\cdot c_5\ \ldots\ \beta\cdot c_N]^T \quad (4)$$

Figure 2C:
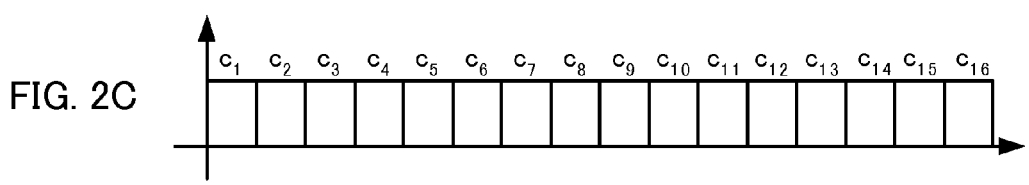
Figure 2D:
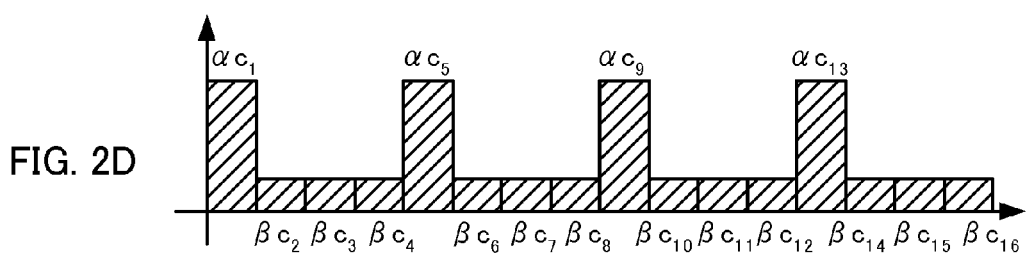

More specifically, the operator 14 multiplies the elements of the data series c shown in FIG. 2C that correspond to the elements having a value of 0 of the inserted data f (c1, c5, c9, c13) by the first amplitude coefficient α and multiplies the other elements of the data series c (c2 to c4, c6 to c8, c10 to c12, c14 to c16) by the second amplitude coefficient β. Then, the operator 14 generates a pilot signal g shown in FIG. 2D. The operator 14 generates and retains the pilot signal g before receiving the inserted data f from the inserter 13. Receiving the inserted data f from the inserter 13, the operator 14 adds the inserted data f to the pilot signal g. The elements of the inserted data f are added to the corresponding elements of the pilot signal g. Then, the operator 14 generates post-operation data shown in FIG. 2E. The operator 14 sends the post-operation data to the IFFT unit 15.

The IFFT unit 15 performs the IFFT on the post-operation data and sends the operation results to the transmitter 16. The transmitter 16 generates a baseband signal based on the operation results of the IFFT unit 15. The transmitter 16 generates a transmission signal from the baseband signal and sends the transmission signal to another device via the antenna 10.

Figure 3:
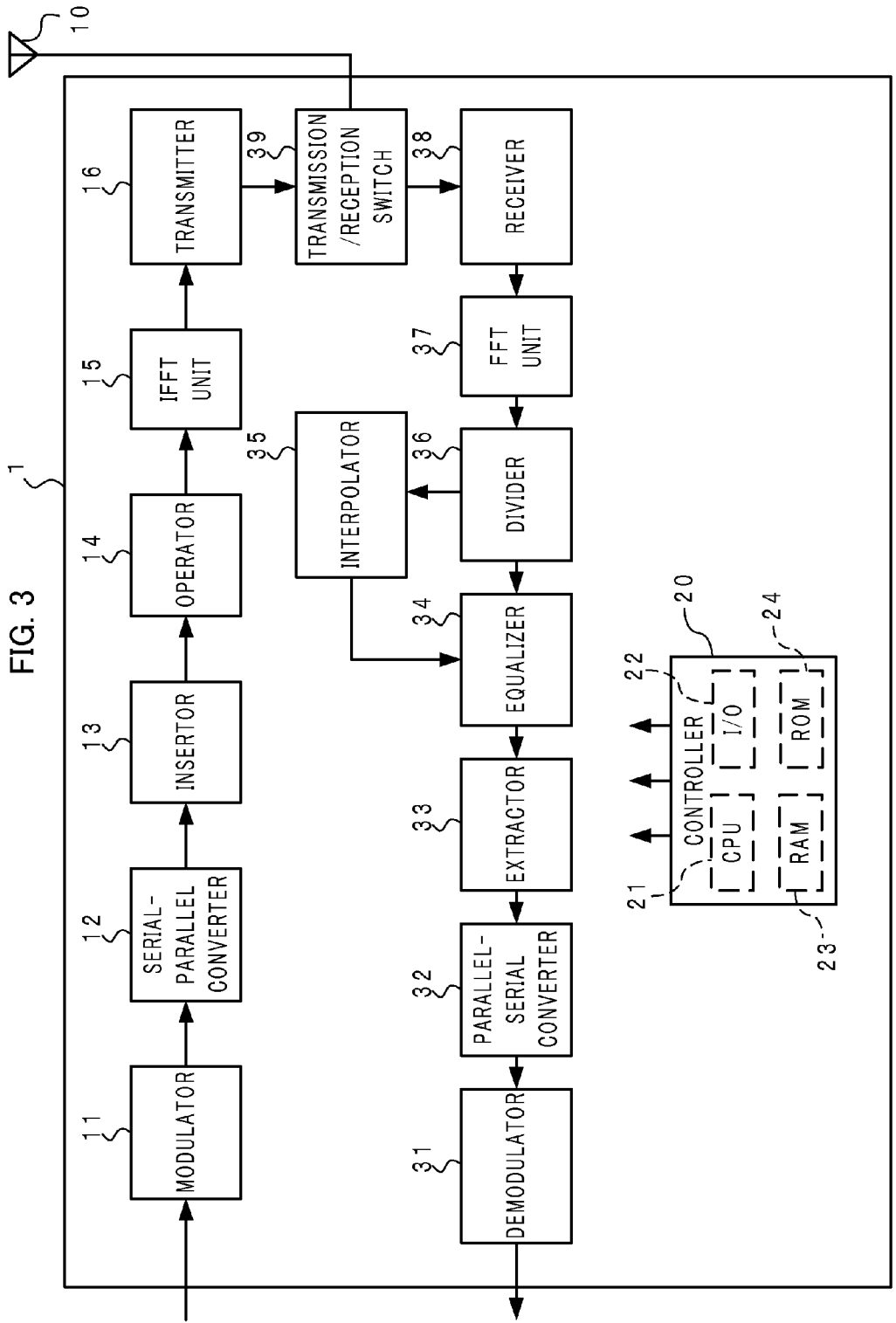
FIG. 3 is a block diagram illustrating another configuration example of the communication apparatus according to the embodiment.

The configuration of the communication apparatus 1 when the communication apparatus 1 shown in FIG. 1 is provided with reception capability will be described hereafter with reference to FIG. 3. The communication apparatus 1 comprises, in addition to the components 11 to 16 shown in FIG. 1, a demodulator 31, a parallel-serial converter 32, an extractor 33, an equalizer 34, an interpolator 35, a divider 36, an FFT unit 37, a receiver 38, and a transmission/reception switch 39.

The receiver 38 receives a transmission signal via the antenna 10 and transmission/reception switch 39. The receiver 38 generates a baseband signal from the transmission signal and performs a serial-parallel conversion on the baseband signal. The receiver 38 sends the serial-parallel-converted baseband signal to the FFT unit 37. The FFT unit 37 performs the FFT on the serial-parallel-converted baseband signal to generate converted data and sends the converted data to the divider 36.

The divider 36 generates received data $r_d$ comprising the converted data f of which the values of the elements at predetermined positions are replaced with zero. Furthermore, the divider 36 generates interpolation data $r_p$ comprising the converted data f of which the values of the elements at the other positions are replaced with zero. Here, the predetermined positions are the positions where the elements of the inserted data f generated at the transmission side have a value of zero (the positions where the elements are inserted at the transmission side) and this information is retained in advance and shared with the transmission side as described above. For example, when the inserted data f expressed by the equation (2) is generated at the transmission side, the divider 36 generates the received data $r_d$ and interpolation data $r_p$ from the converted data r as expressed by the equation (5).

[Eq 5]

$$r = [r_1\ r_2\ r_3 r_4 r_5 \ldots r_N]^T$$

$$r_d = [0\ r_2\ r_3\ r_4\ 0 \ldots r_N]^T$$

$$r_p = [r_1\ 0\ 0\ 0\ r_5 \ldots 0]^T \quad (5)$$

Figure 2E:
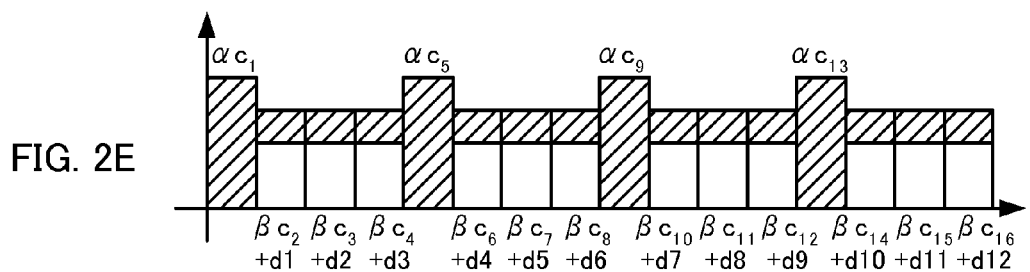
Figure 4A:
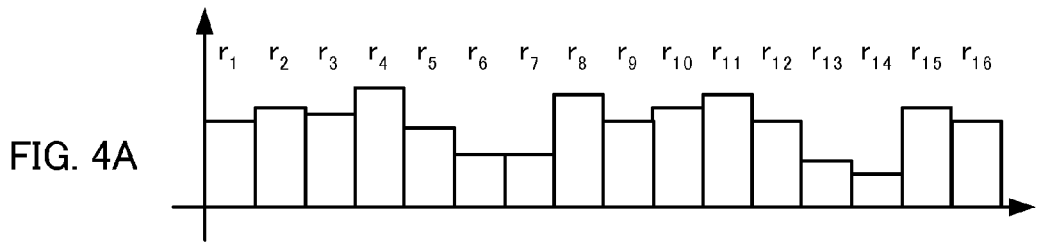
FIGS. 4A to 4F are diagrams illustrating an example of the operation processing performed by the communication apparatus at the reception side according to the embodiment.

More specifically, for example, when the receiver 38 of the communication apparatus 1 receives a transmission signal generated based on the post-operation data shown in FIG. 2E, the converted data r shown in FIG. 4A are sent to the divider 36. Since the converted data r are affected by fading, the converted data r are not exactly equal to the post-operation data shown in FIG. 2E.

Figure 4B:
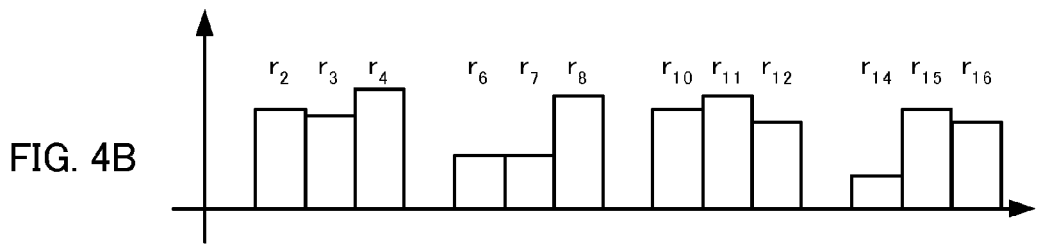

The divider 36 replaces the values of the elements at the predetermined positions of the converted data r (the positions where the elements are inserted at the transmission side) with zero to generate received data $r_d$ shown in FIG. 4B. Furthermore, the divider 36 replaces the values of the elements at the other positions of the converted data r to generate interpolation data $r_p$ shown in FIG. 4C. The divider 36 sends the received data $r_d$ to the equalizer 34 and sends the interpolation data $r_p$ to the interpolator 35.

Figure 4C:
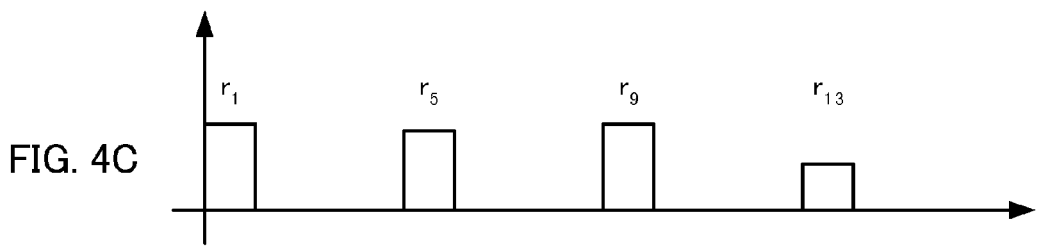
Figure 4D:
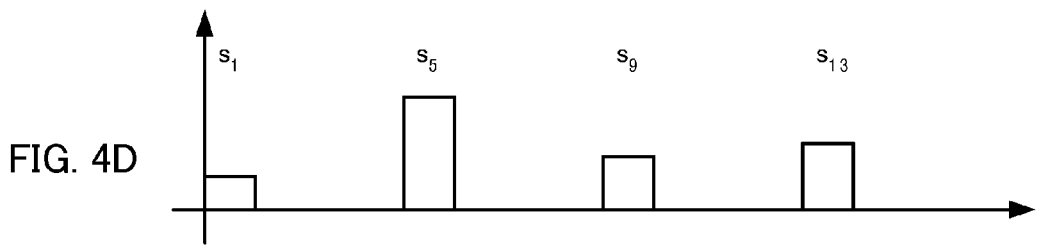

The interpolator 35 divides the interpolation data $r_p$ by the pilot signal g as expressed by the equation (6). The equation (6) presents the elements of the numerator matrix being divided by the corresponding elements of the denominator matrix. In other words, the elements of the interpolation data $r_p$ are divided by the corresponding elements of the pilot signal g. Then, the interpolation data $r_p$ shown in FIG. 4C are converted to interpolation data $s_p$ shown in FIG. 4D. The pilot signal g is equal to the pilot signal g expressed by the equation (4) and used at the transmission side. In other words, the interpolator 35 retains in advance a pilot signal g used at the transmission side or a data series, first amplitude coefficient, and second amplitude coefficient for creating the pilot signal g.

[Eq 6]

$$s_p = \frac{r_p}{g}$$

$$= [s_1\ 0\ 0\ 0\ s_5 \ldots 0]^T \quad (6)$$

Figure 4E:
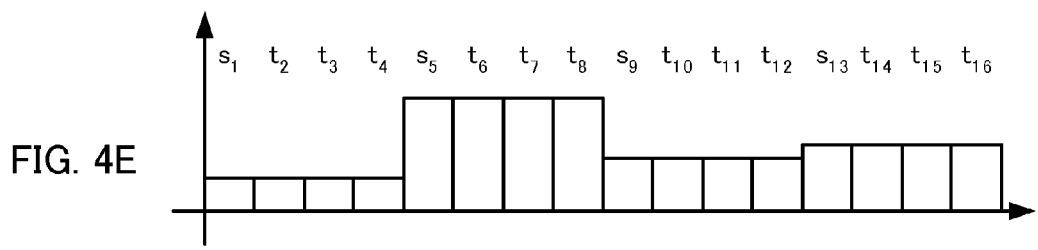

The interpolator 35 interpolates the elements of the computed interpolation data $s_p$ other than the elements (the elements having a value of 0) of the interpolation data $s_p$ at the positions corresponding to the predetermined positions (the positions where the elements are inserted) in the converted data r with the values of those elements. The interpolator 35 performs, for example, zero-order interpolation to generate interpolated data $t_p$ expressed by the equation (7). Of the interpolated data $t_p$ expressed by the equation (7), t2, t3, and t4 present the same value as s1. More specifically, the interpolator 35 interpolates the elements situated immediately after the elements s1, s5, s9, and s13 and having a value of 0 with the values of the elements s1, s5, s9, and s13. Then, the interpolator 35 generates interpolated data $t_p$ shown in FIG. 4E. The interpolator 35 sends the interpolated data $t_p$ to the equalizer 34. Incidentally, the interpolator 35 can perform not only zero-order interpolation but also linear interpolation, spline interpolation, interpolation using, for example, a FIR (finite impulse response) filter, or the like.

[Eq 7]

$$t_p = [s_1\ t_2\ t_3\ t_4\ s_5 \ldots t_N]^T \quad (7)$$

The equalizer 34 performs equalization on the received data $r_p$ based on the interpolated data $t_p$. Equalization is a process to correct distortion that has occurred on the transmission path. The equalizer 34 performs, for example, ZF (zero forcing) equalization. Provided that the FFT size is N and a transmission signal is sent in a transmission frame containing M data symbols, post-FFT data X (k, l) corresponding to a subcarrier number l of a data symbol having a symbol number k is expressed by the equation (8). In the equation (8), H ($f_l$) presents the transmission path characteristic, D (k, l) presents the data symbol, Z (k, l) presents noise, and $f_l$ is the frequency of the subcarrier having a subcarrier number l.

[Eq 8]

$$X(k,l) = H(f_l)D(k,l) + Z(k,l) \quad (8)$$

The ZF equalization is performed by dividing the post-FFT data X (k, l) by the estimated transmission path characteristic H ($f_l$) as expressed by the equation (9) in which $D_{ZF}$ presents data obtained as a result of performing the ZF equalization.

[Eq 9]

$$D_{ZF} = \frac{X(k,l)}{H(f_l)} = D(k,l) + \frac{Z(k,l)}{H(f_l)} \quad (9)$$

Figure 4F:
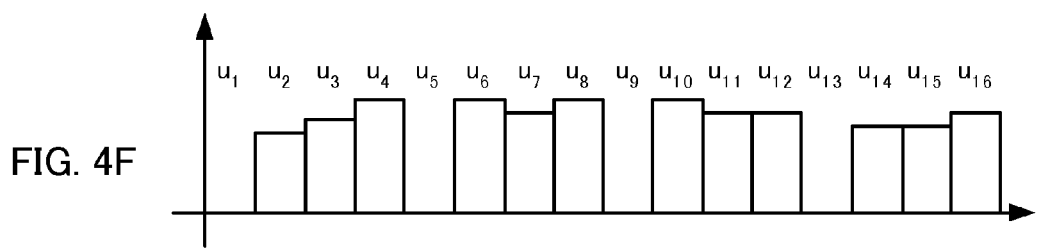

The equalizer 34 divides the received data $r_d$ by the interpolated data $t_p$ as expressed by the equation (10). In other words, the equalizer 34 performs an equalization procedure in which the elements of the received date $r_d$ are divided by the corresponding elements of the interpolated data $t_p$ using the interpolated data $t_p$ as the transmission path characteristic. Then, the received data $r_d$ shown in FIG. 4B are converted to equalized data u shown in FIG. 4F. The equalizer 34 sends the equalized data u to the extractor 33.

[Eq 10]

$$u = \frac{r_d}{t_p}$$

$$= [u_1\ u_2\ u_3\ u_4\ u_5 \ldots u_N]^T \quad (10)$$

Figure 5A:
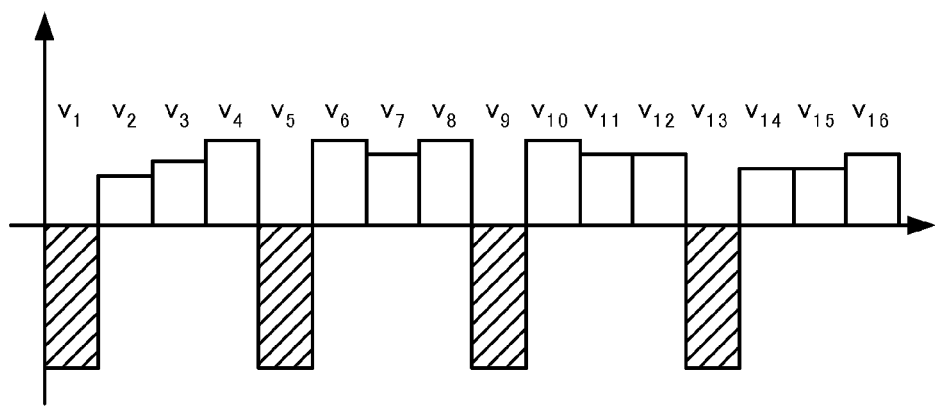
FIGS. 5A and 5B are diagrams illustrating an example of the operation processing performed by the communication apparatus at the reception side according to the embodiment.

The extractor 33 subtracts the pilot signal g from the equalized data u as expressed by the equation (11). More specifically, the extractor 33 subtracts the elements of the pilot signal g from the corresponding elements of the equalized data u as shown in FIG. 5A.

[Eq 11]

$$v = u - g$$

$$= [v_1\ v_2\ v_3\ v_4\ v_5 \ldots v_N]^T \quad (11)$$

Figure 5B:
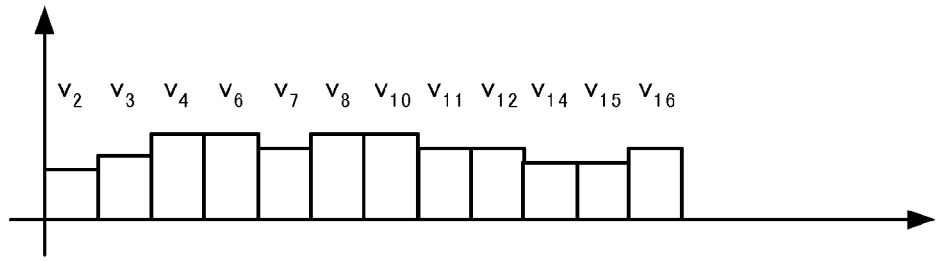

Furthermore, the divider 36 extracts the elements of data v obtained as a result of subtracting the pilot signal g except the elements at the positions corresponding to the predetermined positions (the positions where the elements are inserted) in the converted data r (the elements except the inserted elements) as expressed by the equation (12). Then, the extractor 33 generates extracted data w shown in FIG. 5B from the data v shown in FIG. 5A. As shown in FIG. 5B, the extracted data w are not exactly equal to the serial-parallel-converted signal d shown in FIG. 2A because of influence of fading. However, as long as the error is within a given range, the serial-parallel-converted signal d can be restored correctly in the subsequent demodulation process. The extractor 33 sends the extracted data w to the parallel-serial converter 32.

[Eq 12]

$$w=[v_2\ v_3\ v_4\ v_6\ v_7\ \ldots\ v_N]^T \quad (12)$$

The parallel-serial converter 32 parallel-serial-converts the extracted data w and sends the parallel-serial-converted data w to the demodulator 31. The demodulator 31 demodulates the parallel-serial-converted data w with a given demodulation scheme to restore the input signal.

Figure 6:
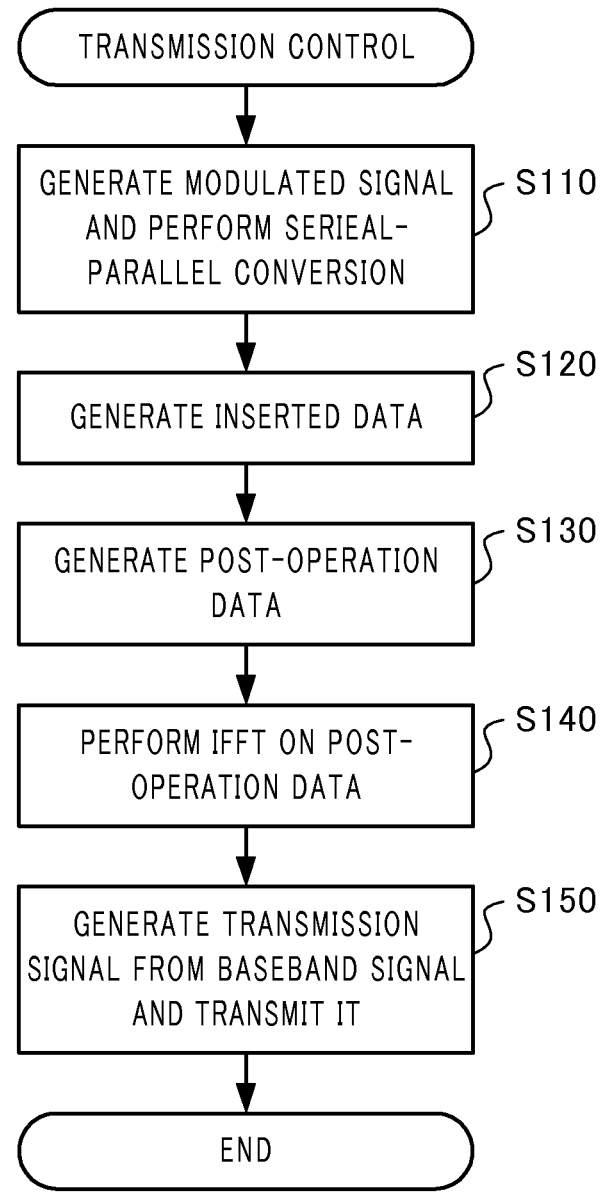
FIG. 6 is a flowchart illustrating an example of the operation for transmission control that is performed by the communication apparatus according to the embodiment.

The transmission control operation performed by the communication apparatus 1 will be described hereafter with reference to the flowchart of FIG. 6. The modulator 11 modulates an input signal to generate a modulated signal and the serial-parallel converter 12 serial-parallel-converts the modulated signal (Step S110). The inserter 13 inserts elements having a value of 0 in the serial-parallel-converted signal at predetermined positions to generate inserted data f of which the number of elements is equal to the FFT size (Step S120). The operator 14 adds a pilot signal g comprising any data series of which the elements are multiplied by a first amplitude coefficient or a second amplitude coefficient to the inserted data f to generate post-operation data (Step S130).

The IFFT unit 15 performs the IFFT on the post-operation data (Step S140). The transmitter 16 generates a baseband signal based on the operation results of the IFFT unit 15 and generates a transmission signal from the baseband signal. The transmitter 16 sends the generated transmission signal to another device via the transmission/reception switch 39 and antenna 10 (Step S150). After the processing in the Step S150 is performed, the series of transmission control ends.

Figure 7:
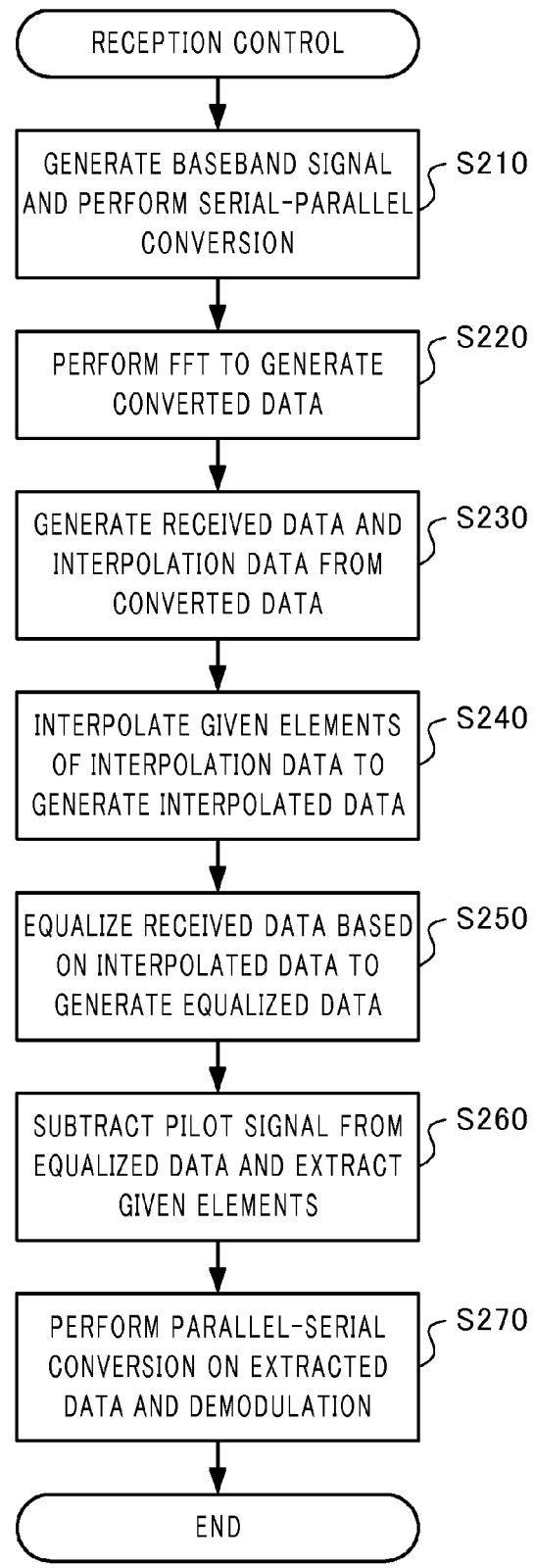
FIG. 7 is a flowchart illustrating an example of the operation for reception control that is performed by the communication apparatus according to the embodiment.

The reception control operation performed by the communication apparatus 1 will be described hereafter with reference to the flowchart of FIG. 7. The receiver 38 receives a transmission signal via the antenna 10 and transmission/reception switch 39. The receiver 38 generates a baseband signal from the transmission signal and serial-parallel-converts the baseband signal (Step S210). The FFT unit 37 performs the FFT on the baseband signal serial-parallel-converted by the receiver 38 to generate converted data r (Step S220). The divider 36 replaces the values of the elements of the converted data r at the predetermined positions (the positions where the elements are inserted) with zero to generate received data $r_d$. Furthermore, the divider 36 generates interpolation data $r_p$ comprising the converted data r of which the values of the elements at the other positions are replaced with zero (Step S230).

The interpolator 35 generates interpolation data $s_p$ comprising the interpolation data $r_p$ divided by the pilot signal g. The interpolator 35 interpolates the elements of the interpolation data $s_p$ other than the elements (the elements having a value of 0) of the interpolation data $s_p$ at the positions corresponding to the predetermined positions in the converted data r with the values of those elements. With this interpolation, the interpolator 35 generates interpolated data $t_p$ (Step S240). The equalizer 34 equalizes the received data $r_d$ based on the interpolated data $t_p$ to generate equalized data u (Step S250). The extractor 33 subtracts the pilot signal g from the equalized data u. Furthermore, the extractor 33 extracts the elements of data v obtained as a result of subtracting the pilot signal g except the elements at the positions corresponding to the predetermined positions in the converted data r (the elements except the inserted elements) to generate extracted data w (Step S260). The parallel-serial converter 32 parallel-serial-converts the extracted data w generated by the extractor 33. The demodulator 31 demodulates the parallel-serial-converted data w to restore the input signal (Step S270). After the processing in the Step S270 is performed, the series of reception control ends.

(Specific Embodiments)

The prior art communication apparatus and the communication apparatus 1 according to this embodiment were compared in the CCDF (Complementary Cumulative Distribution Function) of their PAPRs, namely a characteristic of the occurrence of a PAPR, using a QPSK modulation scheme and a FFT size of 2048. The prior art communication apparatus inserted a pilot signal in a serial-parallel-converted input signal at given positions and performed the IFFT on the modulated signal in which the pilot signal was inserted to generate a baseband signal. The pilot signal was random data having the same signal constellation diagram as the modulated signal.

Figure 8:
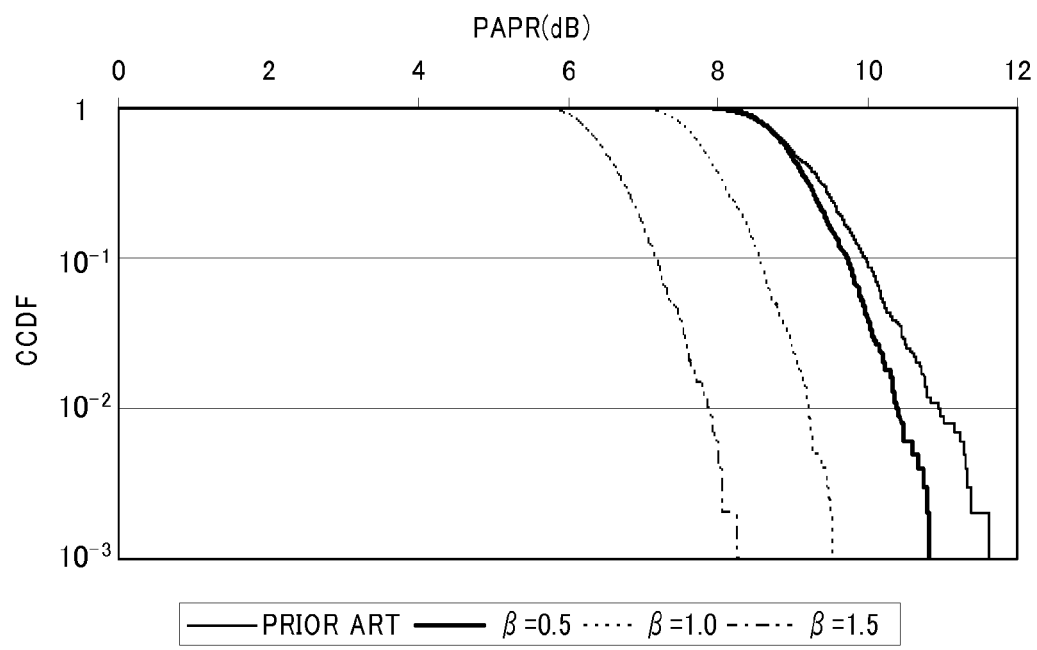
FIG. 8 is a diagram illustrating CCDF characteristic of the PAPR of simulated baseband signal of the communication according to the embodiment.

The communication apparatus 1 according to this embodiment inserted 512 elements having a value of 0 in a modulated signal at equal intervals and generated baseband signals using the above equation (4) in which the first amplitude coefficient α was 2.0 and the second amplitude coefficient β was 0.5, 1.0, or 1.5. FIG. 8 shows the simulation results according to this embodiment in the above cases along with the simulation results according to the prior art. In FIG. 8, the PAPR is plotted as abscissa (unit: dB) and the PAPR CCDF is plotted as ordinate. In FIG. 8, the thin solid line presents the simulation results according to the prior art, the thick solid line presents the simulation results according to this embodiment when the second amplitude coefficient β is 0.5, the dotted line presents the simulation results according to this embodiment when the second amplitude coefficient β is 1.0, and the dash-dot line presents the simulation results according to this embodiment when the second amplitude coefficient β is 1.5. It is understood from the simulation results shown in FIG. 8 that the communication apparatus 1 according to this embodiment has the PAPR reduced compared with the prior art communication apparatus. It is further understood the degree of reduction of the PAPR is improved as the first amplitude coefficient α is greater than the second amplitude coefficient β and the difference between the first and second amplitude coefficients α and β is smaller. Therefore, the first amplitude coefficient α and second amplitude coefficient β are set so that α>β is satisfied and α−β is equal to or less than a threshold determined based on simulation results. In this way, the communication apparatus 1 can efficiently reduce the PAPR of a baseband signal.

Figure 9:
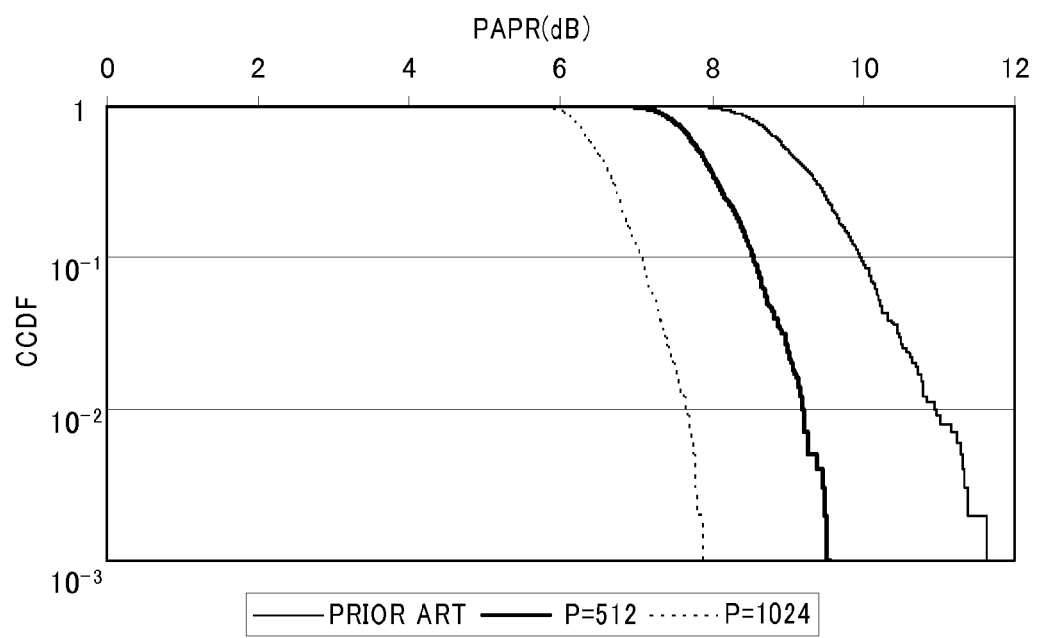
FIG. 9 is a diagram illustrating CCDF characteristic of the PAPR of simulated baseband signal of the communication according to the embodiment.

Furthermore, the communication apparatus 1 according to this embodiment generated baseband signals using the above equation (4) in which the first and second amplitude coefficients α and β are fixed (α=2.0 and β=1.0) and the number of elements having a value of 0 and inserted in a modulated signal, P, of 512 or 1024. FIG. 9 shows the simulation results according to this embodiment in the above cases along with the simulation results according to the prior art. In FIG. 9, the PAPR is plotted as abscissa (unit: dB) and the PAPR CCDF is plotted as ordinate. In FIG. 9, the thin solid line presents the simulation results according to the prior art, the thick solid line presents the simulation results according to this embodiment when the number of elements P was 512, and the dotted line presents the simulation results according to this embodiment when the number of elements P was 1024. It is understood from the simulation results shown in FIG. 9 that the communication apparatus 1 according to this embodiment has the PAPR reduced compared with the prior art communication apparatus. It is further understood that the degree of the PAPR being reduced is improved as the number of elements P is increased. Therefore, the communication apparatus 1 can efficiently reduce the PAPR of a baseband signal by changing the number of elements inserted in a modulated signal.

Figure 10:
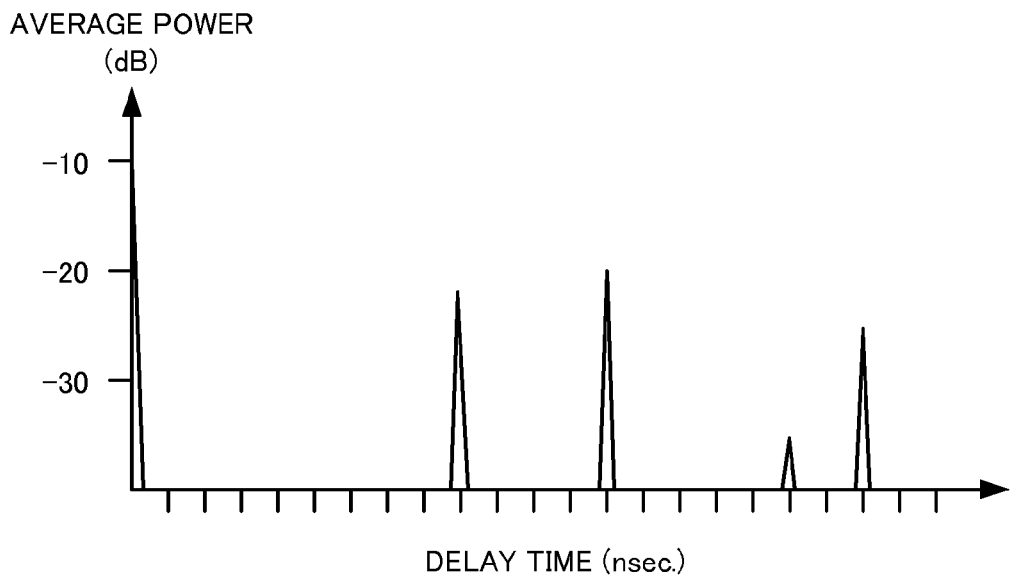
FIG. 10 is a diagram illustrating a general delay profile of the transmission path used in the simulation according to the embodiment.

Furthermore, influence of fading through the transmission path was simulated. The number of multipath was six and the number of wavelets arriving at the reception side antenna was 32. The values shown in Table 1 were used as the delay profile presenting the relationship between the delay time of delayed waves comprising wavelets and the average power that is the average of the received power in a given segment of the antenna including a given number of wavelengths. FIG. 10 shows an outline of the delay profile on the transmission path.

TABLE 1

| Delay time (nsec.) | Average electric power (dB) |
|---|---|
| 0 | −2.5 |
| 300 | 0 |
| 8900 | −12.8 |
| 12900 | −10.0 |
| 17100 | −25.2 |
| 20000 | −16.0 |

As for the Doppler shift, the reference subcarrier frequency was 5.6 GHz and the moving speed of the transmission side communication apparatus was variable. The OFDM communication scheme used in the simulation included no interleaving or error correction.

Figure 11:
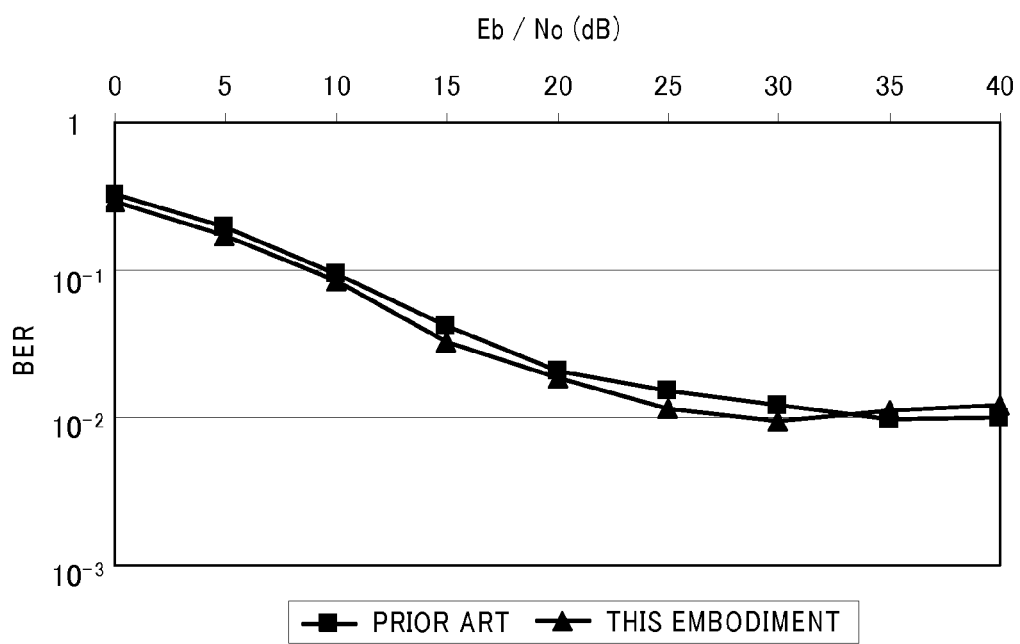
FIG. 11 is a diagram illustrating BER characteristics of the communication apparatus according to the embodiment.
Figure 12:
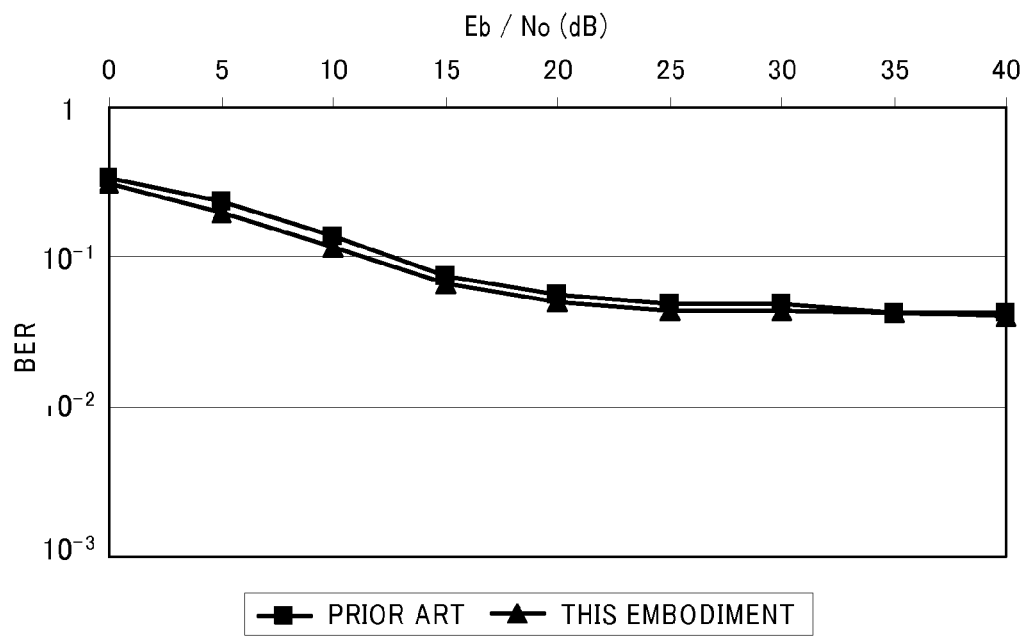
FIG. 12 is a diagram illustrating BER characteristics of the communication apparatus according to the embodiment.
Figure 13:
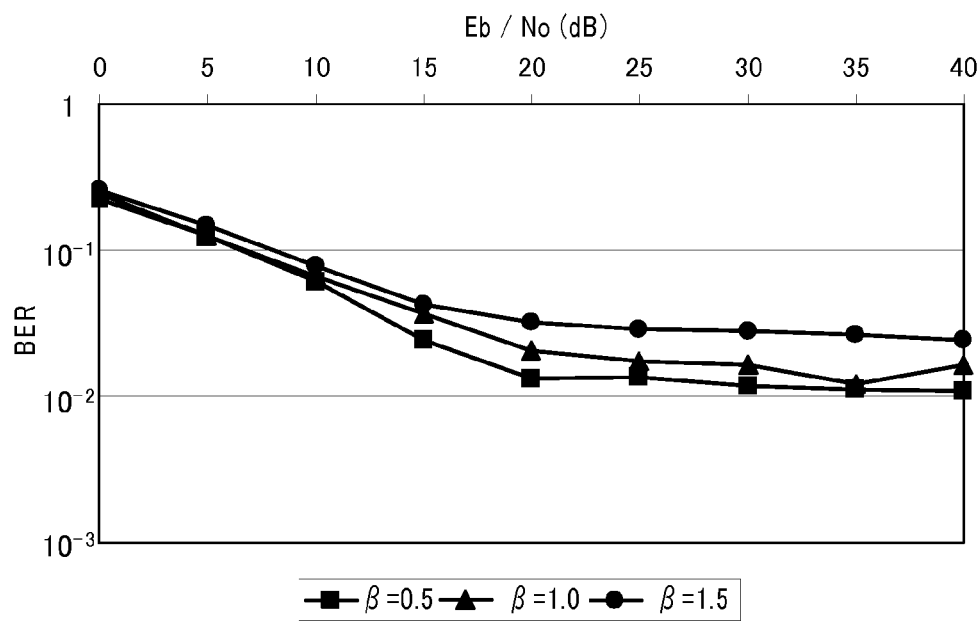
FIG. 13 is a diagram illustrating BER characteristics of the communication apparatus according to the embodiment.

The BER characteristic of the prior art communication apparatus and the communication apparatus 1 according to this embodiment will be described with reference to FIGS. 11 to 13. In FIGS. 11 to 13, the Eb/No (energy per bit to noise power spectral density ratio) is plotted as abscissa and the BER is plotted as ordinate. The Eb/No is presented in dB.

FIG. 11 shows the simulation results of the prior art communication apparatus and the communication apparatus 1 according to this embodiment when the moving speed was 0 km/h, the number of elements P inserted in a modulated signal by the communication apparatus 1 was 512, and the first amplitude coefficient α was 1.0 and the second amplitude coefficient β was 0.5 in the above equation (4). The prior art BER is plotted with squares. The BER according to this embodiment is plotted with triangles. As shown in FIG. 11, it is understood that the prior art BER and the BER according to this embodiment are nearly equal.

FIG. 12 shows the simulation results of the prior art communication apparatus and the communication apparatus 1 according to this embodiment when the moving speed was 100 km/h, the number of elements P inserted in a modulated signal by the communication apparatus 1 was 64, and the first amplitude coefficient α was 1.0 and the second amplitude coefficient β was 0.5 in the above equation (4). As shown in FIG. 12, it is understood that the prior art BER and the BER according to this embodiment are nearly equal. It is understood from the simulation results shown in FIGS. 11 and 12 that the BER according to this embodiment does not depend on the number of elements inserted by the inserter 13 or the moving speed.

FIG. 13 shows the simulation results of the communication apparatus 1 according to this embodiment when the moving speed was 0 km/h, the number of elements P inserted in a modulated signal was 512, and the first amplitude coefficient α was 2.0 and the second amplitude coefficient β was 0.5, 1.0, or 1.5 in the above equation (4). In FIG. 13, the simulation results when the second amplitude coefficient β was 0.5 are plotted with squares, the simulation results when the second amplitude coefficient β was 1.0 are plotted with triangles, and the simulation results when the second amplitude coefficient β was 1.5 are plotted with circles. It is understood from the simulation results shown in FIG. 13 that the BER deteriorates as the first amplitude coefficient α becomes greater than the second amplitude coefficient β and the difference between the first and second amplitude coefficients α and β becomes less. This is because errors occur during the demodulation, for example, when the elements of a modulated signal and the elements of the data series cancel each other and the values of the elements of the post-operation data become less than the values of noise.

As described above, the communication apparatus 1 according to this embodiment can reduce the PAPR more efficiently with a relatively simple configuration even in the case of multicarrier transmission. Furthermore, the degree of the PAPR being reduced can be adjusted by changing the first and second amplitude coefficients α and β in the equation (4).

Figure 14:
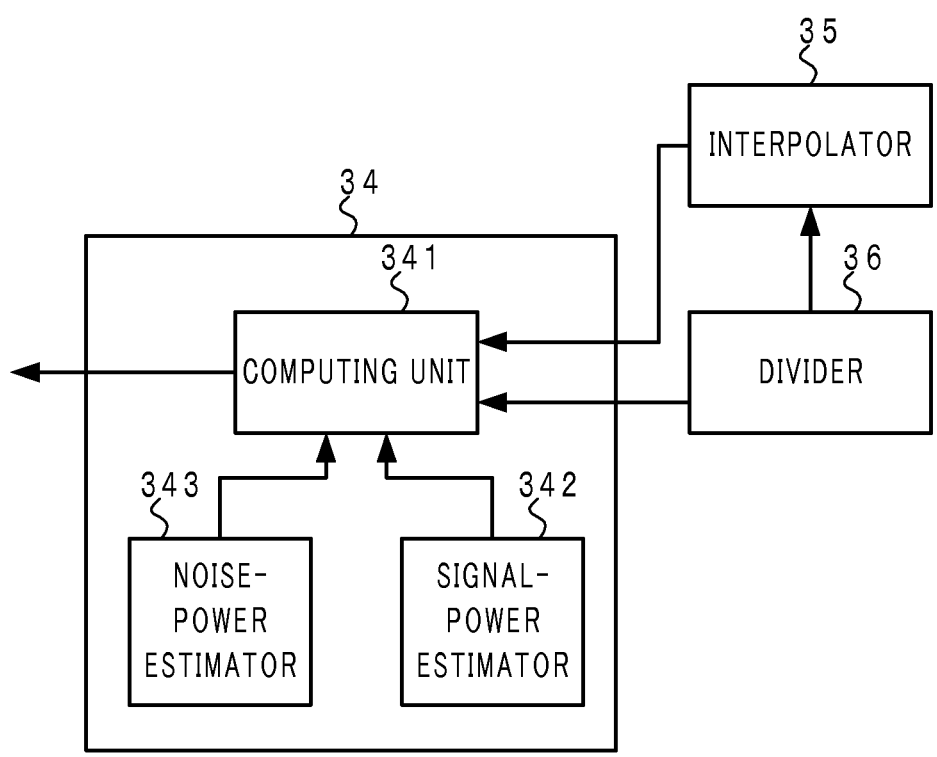
FIG. 14 is a block diagram illustrating another configuration example of the equalizer.

Incidentally, the equalizer 34 can perform the equalization using a MMSE (minimum mean square error) scheme instead of the ZF equalization described in the above embodiment. Such a case will be described with reference to FIG. 14. The equalizer 34 comprises an operator 341, a signal power estimator 342, and a noise power estimator 343.

The MSE (mean square error) between a transmitted data symbol and a received data symbol is expressed by the equation (13) in which E[ ] presents the average value in a time domain. A weight W (l) minimizing the MSE (l) is expressed by the equation (14) in which X* (k, l) is the complex conjugate of X (k, l) and the suffix * indicates a complex conjugate.

[Eq 13]

$$MSE(l) = E[|D(k, l) - W(l)X(k, l)|^2] \quad (13)$$

[Eq 14]

$$W_{opt}(l) = \frac{E[|D(k, l)X^*(k, l)|^2]}{E[|X(k, l)|^2]} \quad (14)$$

The equation (14) is transformed to the equation (15) based on the equation (8) given in the above embodiment.

[Eq 15]

$$W_{opt}(l) = \frac{H*(f_l)}{|H(f_l)|^2 + \frac{E[|Z(k, l)|^2]}{E[|D(k, l)|^2]}} \quad (15)$$

The operator 341 performs equalization by multiplying $W_{opt}$ (l) expressed by the equation (15) by X (k, l) as expressed by the equation (16) in which $D_{MMSE}$ is data after the MMSE equalization. The ZF scheme of the equation (9) has a risk of increasing noise components when the absolute value of the transmission path characteristic H ($f_l$) is small. The MMSE scheme of the equation (16) can prevent increase of noise components.

[Eq 16]

$$D_{MMSE}(k, l) = W_{opt}(l)X(k, l) \quad (16)$$

The signal power estimator 342 estimates the average data symbol power E [|D|²] based on the transmission signal modulation scheme and sends the average data symbol power to the operator 341. The noise power estimator 343 estimates the average noise power $E[|Z|^2]$ and sends the average noise power to the operator 341. The operator 341 calculates $W_{opt}$ as expressed by the equation (17) using the interpolated data $t_p$ sent from the interpolator 35 as the transmission path characteristic.

[Eq 17]

$$W_{opt} = \frac{(t_p)^*}{|t_p|^2 + \frac{E[|Z|^2]}{E[|D|^2]}} \quad (17)$$

The operator 341 performs equalization by multiplying the elements of $W_{opt}$ by the elements of the received data $r_d$ sent from the divider 36 as expressed by the equation (18). The operator 341 sends equalized data u or data obtained as a result of the equalization to the extractor 33.

[Eq 18]

$$u = W_{opt} \cdot r_d \quad (18)$$

Furthermore, the modulation scheme of the modulator 11 is not limited to the QPSK. Other than the QPSK, the PSK (phase shift keying) or QAM (quadrature amplitude modulation) can be used. The order of processing performed by the modulator 11 and serial-parallel converter 12 and the order of processing performed by the serial-parallel converter 12 and inserter 13 can be reversed, respectively. For example, the inserter 13 can insert elements having a value of 0 in a modulated signal modulated by the modulator 11 (a modulated signal before serial-parallel-converted) at predetermined positions to generate inserted data. In such a case, the serial-parallel converter 12 can perform serial-parallel-conversion on the inserted data generated by the inserter 13. Furthermore, the serial-parallel converter 12 can be provided immediately after the operator 14. In other words, the serial-parallel converter 12 can perform serial-parallel-conversion on the post-operation data generated by the operator 14. Furthermore, the order of processing performed by the demodulator 31 and parallel-serial converter 32 can be reversed. In other words, the demodulator 31 can demodulate the extracted data extracted by the extractor 33 (the extracted data before parallel-serial-converted) and the parallel-serial converter 32 can perform parallel-serial-conversion on the input signal restored by the demodulator 31.

The equalizer 34, interpolator 35, and divider 36 of the communication apparatus 1 can each be eliminated. In other words, it is possible that the communication apparatus 1 performs no equalization and the demodulator 31, parallel-serial converter 32, extractor 33, FFT unit 37, and receiver 38 fulfill the reception function of the communication apparatus 1. In such a case, the extractor 33 subtracts the pilot signal g from the converted data r generated by the FFT unit 37 and extracts the elements of the post-subtraction converted data except the elements at the predetermined positions to generate extracted data w.

Additionally, $\alpha$ and $\beta$ in the equation (4) do not necessarily satisfy $\alpha > \beta$ and can be those satisfying $\alpha \leq \beta$. The IFFT unit 15 can be configured to perform the IDFT instead of the IFFT. The FFT unit 37 can be configured to perform the DFT instead of the FFT.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus, comprising:
an inserter that adds an element having a value of 0 into predetermined positions of a modulated signal to generate inserted data including all of the elements of the modulated signal, the number of elements of the inserted data being equal to a size of Fast Fourier Transformation (FFT);
an operator that adds a pilot signal to the inserted data to generate post-operation data, in which the pilot singal comprises a data series of which the number of elements is equal to the size of FFT and of which the elements at the positions corresponding to the predetermined positions are multiplied by a first amplitude coefficient and the elements other than the elements multiplied by the first amplitude coefficient are multiplied by a second amplitude coefficient having a value different from the first amplitude coefficient;
an IFFT unit that performs an Inverse Fast Fourier Transformation (IFFT) on the post-operation data; and
a transmitter that generates a baseband signal based on the post-operation data on which the IFFT is performed and transmits a transmission signal generated from the baseband signal,
wherein the positions at which the elements are inserted are determined in advance and the position information is shared between the transmission side and reception side; and
wherein the first amplitude coefficient is greater than the second amplitude coefficient and the difference between the first and second amplitude coefficients is equal to or less than a threshold.

2. A communication apparatus comprising:
a receiver that receives a transmission signal from an external source and generates a baseband signal from the transmission signal;
an FFT unit that performs a Fast Fourier Transformation (FFT) on the baseband signal to generate converted data;
a divider that generates received data comprising the converted data in which the values of the elements at the predetermined positions are replaced with elements having a value of 0 and generates interpolation data comprising the converted data in which the values of the elements at the positions other than the predetermined positions are replaced with elements having a value of 0;
an interpolator that divides the interpolation data by a pilot signal to generate interpolated data comprising the divided interpolation data of which the elements having a value of 0 are interpolated with the values of the other elements;
an equalizer that equalizes the received data based on the interpolated data to generate an equalized data;
an extractor that subtracts the pilot signal from the converted data, in which the pilot signal comprises a data series of which the number of elements is equal to the FFT size and of which the elements at the positions corresponding to predetermined positions in the converted data are multiplied by a first amplitude coefficient and the elements other than the elements multiplied by the first amplitude coefficient are multiplied by a second amplitude coefficient, and also extracts the elements of the post-subtraction converted data except the elements at the predetermined positions to generate extracted data; and a demodulator that demodulate the extracted data,
wherein the extractor subtracts the pilot signal from the equalized data instead of subtracting the pilot signal from the converted data and extracts the elements of the post-subtraction equalized data except the elements at the predetermined positions to generate an extracted data.

3. The communication apparatus according to claim 1, wherein the data series is a data series having an autocorrelation property.

4. A communication method, comprising:

an insertion step of adding an element having a value of 0 into predetermined positions of a modulated signal to generate inserted data including all the elements of the modulated signal, the number of elements of the inserted data being equal to a size of Fast Fourier Transformation (FFT);

an operation step of adding a pilot signal to the inserted data to generate post-operation data, in which the pilot signal comprises a data series of which the number of elements is equal to the size of FFT and of which the elements at the positions corresponding to the predetermined positions are multiplied by a first amplitude coefficient and the elements other than the elements multiplied by the first amplitude coefficient are multiplied by a second amplitude coefficient having a value different from the first amplitude coefficient;

an IFFT step of performing Inverse Fast Fourier Transformation (IFFT) on the post-operation data; and a transmission step of generating a baseband signal based on the post-operation data on which the IFFT is performed and transmitting a transmission signal generated from the baseband signal, wherein the positions at which the elements are inserted are determined in advance and the position information is shared between the transmission side and reception side; and wherein the first amplitude coefficient is greater than the second amplitude coefficient and the difference between the first and second amplitude coefficients is equal to or less than a threshold.

5. A communication method, comprising:

a reception step of receiving a transmission signal from an external source and generating a baseband signal from the transmission signal;

an FFT step of performing a Fast Fourier Transformation (FFT) on the baseband signal to generate converted data;

a divider step of generating received data comprising the converted data in which the values of the elements at the predetermined positions are replaced with elements having a value of 0 and generating interpolation data comprising the converted data in which the values of the elements at the positions other than the predetermined positions are replaced with elements having a value of 0;

an interpolation step of dividing the interpolation data by a pilot signal to generate interpolated data comprising the divided interpolation data of which the elements having a value of 0 are interpolated with the values of the other elements;

an equalization step of equalizing the received data based on the interpolated data to generate equalized data;

an extraction step of subtracting the pilot signal from the converted data, in which the pilot signal comprises a data series of which the number of elements is equal to size of FFT and of which the elements at the positions corresponding to predetermined positions in the converted data are multiplied by a first amplitude coefficient and the elements other than the elements multiplied by the first amplitude coefficient are multiplied by a second amplitude coefficient having a value different from the first amplitude coefficient, and extracting the elements of the post-subtraction converted data except the elements at the predetermined positions to generate extracted data; and a demodulation step of demodulating the extracted data,
wherein the extraction step subtracts the pilot signal from the equalized data instead of subtracting the pilot signal from the converted data and extracts the elements of the post-subtraction equalized data except the elements at the predetermined positions to generate an extracted data.

\* \* \* \* \*